Figure 4:
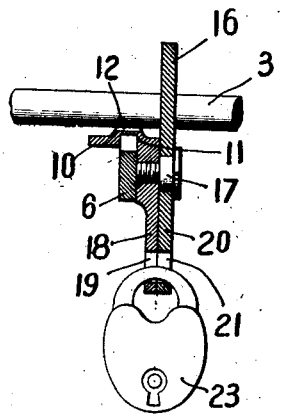

S. L. BENNETT.
THROTTLE LOCK FOR AUTOMOBILES.
APPLICATION FILED MAR. 10, 1913.

1,095,139.

Patented Apr. 28, 1914.

Witnesses.
Fred. S. Greenleaf
Joseph D. Ashe

Inventor.
Samuel L. Bennett,
by Edwards Heard & Smith
Attys.

UNITED STATES PATENT OFFICE.

SAMUEL LESLIE BENNETT, OF BELLOWS FALLS, VERMONT.

THROTTLE-LOCK FOR AUTOMOBILES.

1,095,139.        Specification of Letters Patent.     Patented Apr. 28, 1914.

Application filed March 10, 1913. Serial No. 753,341.

*To all whom it may concern:*

Be it known that I, SAMUEL L. BENNETT, a citizen of the United States, residing at Bellows Falls, county of Windham, State of Vermont, have invented an Improvement in Throttle-Locks for Automobiles, of which the following description, in connection with the accompanying drawing, is a specification, like characters on the drawing representing like parts.

This invention has for its object to provide a novel throttle lever and quadrant member which may be attached to the ordinary quadrant arm of an automobile and by which the throttle lever can be locked in closed position and may be held in any adjusted position.

It is oftentimes very desirable to be able to lock the throttle lever of an automobile but most automobiles are not provided with any locks for this purpose.

My invention aims to provide a novel auxiliary quadrant member which can be applied to the quadrant arm of any automobile and by which the throttle lever may be locked.

My improved quadrant member can be provided with notches of any degree of fineness so that in case the notches of the quadrant arm are too coarse for a fine regulation of the speed of the automobile such fine regulation can be secured by using my improved auxiliary quadrant member.

I will first describe a selected embodiment of my invention from which the principle thereof will be readily apparent and will then point out the novel features in the appended claims.

Figure 1:
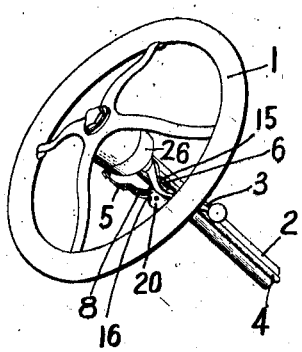
Figure 5:
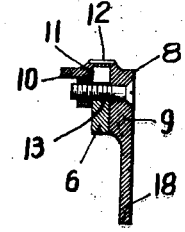
Figure 2:
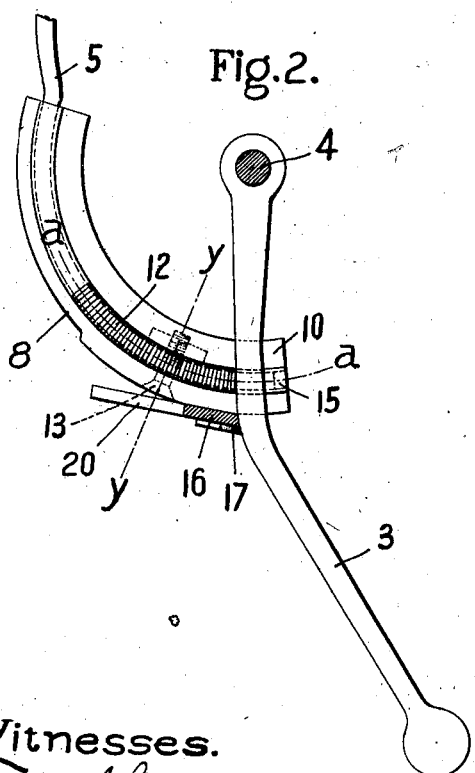
Figure 3:
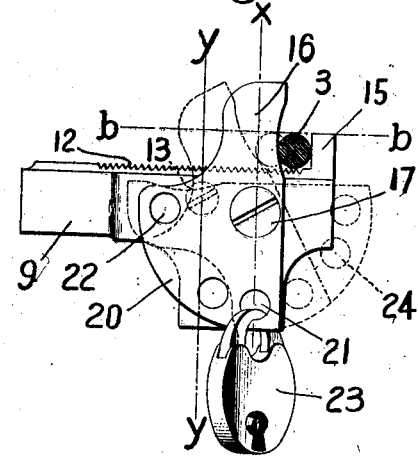
Figure 6:
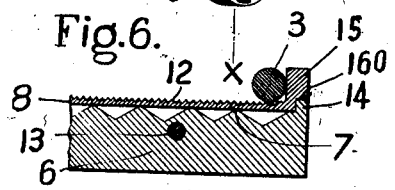

In the drawings wherein I have illustrated one embodiment of my invention, Figure 1 is a perspective view of an automobile steering wheel, the stem therefor and the throttle lever showing my improvements applied thereto; Fig. 2 is an enlarged plan view of the detachable segment and throttle lever, said figure being taken on the section *b—b*, Fig. 3; Fig. 3 is a side view of the detachable segment and the throttle lever lock; Fig. 4 is a section on the line *x—x*, Fig. 3; Fig. 5 is a section on the lines *y—y*, Figs. 2 and 3; Fig. 6 is a section on the line *a—a*, Fig. 2.

1 designates the steering wheel of an automobile which is supported by the usual stem 2.

3 is the throttle lever which is connected to the rod 4 that forms part of the connection leading to the throttle. This throttle lever operates over a segment or quadrant having notches, the notches operating to hold it in any desired position. This segment or quadrant is shown as a quadrant arm 6 having notches 7 formed therein and carried by a quadrant member 5 which is permanently secured to the head 26 of the stem 2.

The parts thus far described, are such as are commonly found in automobiles and form no part of my present invention.

My improved auxiliary quadrant and throttle lock is designed to be detachably applied to the quadrant arm 6. This combined auxiliary quadrant and lock or detachable member, as it may be called, is designated by 8 and it is formed with the horizontally-extending portion 10 which extends across the notched face of the quadrant arm 6 and with the downwardly-extending flange 9 which overlies the outer face of the quadrant arm 6. The horizontal portion 10 of the detachable quadrant member is preferably provided with a groove 11 to receive the upper edge of the quadrant arm 6, and said portion 10 is provided on its upper face with notches 12 to coöperate with the throttle lever 3. The notches 12 may be made as fine or coarse as desired but preferably they will be made comparatively fine. In many automobiles the notches 7 with which the quadrant arm is provided are comparatively coarse, so coarse, in fact, as to prohibit a fine regulation of the speed of the automobile. By making the notches 12 on my detachable quadrant member comparatively fine a very fine adjustment of the speed of the automobile can be secured. The detachable quadrant member may be secured to the quadrant arm in any suitable way which will permit it to be readily placed in position thereon or removed therefrom. One simple construction is that shown in Figs. 2, 3 and 5 wherein the detachable quadrant is held in place by the screw 13 which extends through the flange 9 and the quadrant arm and has a nut 14 applied thereto. The nut engages the under side of the horizontal portion 10 and is prevented from turning thereby so that the screw 13 can be tightened or loosened by turning it with a screwdriver. This detachable quadrant will, of course, have the same curvature as the quadrant arm and will merely fit over the latter, but since it is provided with relatively fine notches it is possible to secure a correspondingly fine adjustment of the throttle lever.

The main quadrant 6 is shown as provided at its end with a projection 14. I have also provided the auxiliary quadrant member 8 with a projection 15 at its end and with a notch 160 to receive the projection 14, as shown in Fig. 6.

The detachable quadrant member herein shown is provided with means for locking the throttle lever in its closed position thereby preventing any unauthorized person from tampering with the throttle. This locking of the throttle is accomplished by means of a locking lever in the shape of a locking finger 16 pivotally mounted on a stud or screw 17 carried by the detachable quadrant. This finger 16 can swing from its operative position shown in full lines Fig. 3 into its inoperative position shown in dotted lines Fig. 3. When it is in its operative position it locks the throttle lever in its closed position and thus prevents the throttle from being opened, while when it is in its dotted line position it is out of the path of movement of the throttle lever and the latter can be operated as usual. The flange 9 is shown as being provided with a depending ear 18 having one or more apertures 19 formed therein, and the locking finger 16 has an extension 20 which overlies the ear 18 and which is provided with two apertures 21 and 22. When the finger is in its operative position shown in full lines Fig. 2 the aperture 21 is in alinement with the aperture 19 and the locking finger can be locked in this operative position by means of a padlock 23 or any other suitable locking device which is adapted to be inserted through the alined apertures 19 and 21. On the other hand, when the locking member is in its inoperative position then the aperture 22 comes into alinement with the aperture 19 and the same locking device 23 can be used to lock the locking lever in its inoperative position.

I may if desired provide the extension 20 with one or more other apertures 24. The purpose of this construction is to provide for locking the throttle closed regardless of the position which the throttle lever occupies at such time. In some constructions the throttle might be closed when the lever 3 is in the dotted line position Fig. 3, while in other cases the lever would be in the full line position when the throttle is closed.

When the automobile is running the locking finger will be locked in its inoperative position. If the operator desires to leave the automobile at some place for a greater or less length of time, he will close the throttle and then swing the locking finger into its operative position and lock the finger in this position by the locking device 23. The throttle cannot be opened except by unlocking the locking finger and this can be done only by the properly-authorized person. My invention, therefore, provides not only a means for providing a fine adjustment of the throttle which is very desirable especially in a crowded city, but it also provides against the theft of the automobile.

My improvement can be applied to any automobile and it is very inexpensive to manufacture.

I have herein shown the clamping screw 13 by which the auxiliary quadrant member is held to the quadrant arm as being situated behind the extension 20 of the locking finger so that said extension prevents the clamping screw from working loose or being removed. This clamping screw 13 may be removed only by turning the locking finger downward or in a position bottom side up from that shown in Fig. 3.

Having fully described my invention, what I claim as new and desire to secure by Letters Patent is:—

1. As an article of manufacture, an auxiliary quadrant member presenting a curved body portion having on its under side a quadrant-receiving groove and on its upper side a series of notches to engage the throttle lever, and a projection constituting a lever stop, and clamping means associated with the body and adapted to clamp said auxiliary quadrant member to the quadrant arm of an automobile.

2. As an article of manufacture, an auxiliary quadrant member provided on its under side with positioning means to fit the quadrant arm of an automobile and retain said auxiliary quadrant in position on said arm, said auxiliary quadrant having on its upper side a plurality of notches to coöperate with the throttle lever, and clamping means associated with said auxiliary quadrant member and adapted to clamp the same to the quadrant arm.

3. As an article of manufacture, an auxiliary quadrant member adapted to overlie and be removably sustained by the quadrant arm of a throttle lever and having a series of fine lever-receiving notches on its upper face, means associated with said auxiliary quadrant member for detachably securing it to the quadrant arm, and a lock for the throttle lever carried by said quadrant member.

4. As an article of manufacture, an auxiliary quadrant member adapted to overlie and be removably sustained by the quadrant arm of a throttle lever and having a series of fine lever-receiving notches on its upper face, means associated with said auxiliary quadrant member for detachably securing it to the quadrant arm, said auxiliary quadrant member having an apertured ear depending therefrom, a locking finger pivoted to the quadrant member and having a portion overlying said ear and provided with two apertures, one of which is in alinement with the aperture in the ear when the locking finger is in its operative position and the other of which is in alinement with said aperture when the locking finger is in its inoperative position, and a lock adapted to extend through the alined apertures to hold the locking finger in either of its two positions.

In testimony whereof I have signed my name to this specification in the presence of two subscribing witnesses.

SAMUEL LESLIE BENNETT.

Witnesses:
G. R. NORRIS,
M. H. JOHNSON.

Copies of this patent may be obtained for five cents each, by addressing the "Commissioner of Patents, Washington, D. C."